(12) United States Patent
Manzini

(10) Patent No.: US 12,172,730 B2
(45) Date of Patent: Dec. 24, 2024

(54) BICYCLE AND RESPECTIVE TRANSMISSION SYSTEM

(71) Applicant: RMU Project S.R.L., Reggio Emilia (IT)

(72) Inventor: Andrea Manzini, Reggio Emilia (IT)

(73) Assignee: RMU Project S.R.L., Reggio Emilia (IT)

( * ) Notice: Subject to any disclaimer, the term of this patent is extended or adjusted under 35 U.S.C. 154(b) by 576 days.

(21) Appl. No.: 17/605,016

(22) PCT Filed: Apr. 1, 2020

(86) PCT No.: PCT/IB2020/053092
§ 371 (c)(1),
(2) Date: Oct. 20, 2021

(87) PCT Pub. No.: WO2020/217119
PCT Pub. Date: Oct. 29, 2020

(65) Prior Publication Data
US 2022/0204136 A1 Jun. 30, 2022

(30) Foreign Application Priority Data

Apr. 23, 2019 (IT) .................. 102019000006262

(51) Int. Cl.
*B62M 19/00* (2006.01)
*B62J 45/411* (2020.01)
(Continued)

(52) U.S. Cl.
CPC ............ *B62M 19/00* (2013.01); *B62J 45/411* (2020.02); *B62M 6/50* (2013.01); *F16H 47/02* (2013.01)

(58) Field of Classification Search
CPC .......... B62M 19/00; B62M 6/50; F16H 47/02
See application file for complete search history.

(56) References Cited

U.S. PATENT DOCUMENTS

| 5,387,000 A * | 2/1995 | Sato ................... B62M 19/00 280/216 |
| 5,938,224 A * | 8/1999 | Brackett ............... B62M 19/00 92/138 |
| 11,345,439 B2 * | 5/2022 | Lee ..................... F16H 61/42 |

FOREIGN PATENT DOCUMENTS

| CN | 2156126 Y * | 2/1994 | ............ B62M 19/00 |
| EP | 2743166 A1 | 6/2014 | |

(Continued)

*Primary Examiner* — Jacob D Knutson
(74) *Attorney, Agent, or Firm* — Dickinson Wright PLLC; Andrew D. Dorisio

(57) ABSTRACT

Herein described is a bicycle comprising a frame, a drive wheel and a pedal crank/pedal assembly which transmits mechanical energy to the drive wheel by means of a transmission system which comprises: a tank containing a hydraulic fluid; a hydraulic circuit in which the hydraulic fluid flows; a hydraulic pump, actuated by the pedal crank/pedal assembly and configured to pump the hydraulic fluid through the hydraulic circuit; at least one hydraulic actuator, arranged along the hydraulic circuit and configured to transform the hydraulic energy supplied by the hydraulic pump to the hydraulic fluid into mechanical energy; and a drive shaft, connected to the hydraulic actuator and configured to transfer the mechanical energy generated by the hydraulic actuator to the drive wheel. The hydraulic pump is connected to an electric motor whose rotational speed, as well as the operating parameters of the hydraulic pump, are controlled by a circuit board. The bicycle comprises at least one first pedal frequency sensor, which controls the electric motor by modulating its rotational speed, so as to make the hydraulic pump rotate more or less rapidly in order to force the circulation of the hydraulic fluid in the hydraulic circuit, facilitating pedalling, and at least one second power sensor, which measures the power applied by the cyclist to the pedal (Continued)

crank/pedal assembly, so as to accordingly adjust the power supplied by the electric motor to drive the hydraulic pump.

9 Claims, 4 Drawing Sheets

(51) Int. Cl.
*B62M 6/50* (2010.01)
*F16H 47/02* (2006.01)

(56) References Cited

FOREIGN PATENT DOCUMENTS

| WO | 9212042 | A1 | 7/1992 |
| WO | 9525036 | A1 | 9/1995 |
| WO | 2016036130 | A1 | 3/2016 |

\* cited by examiner

BICYCLE AND RESPECTIVE TRANSMISSION SYSTEM

TECHNICAL FIELD

The present invention generally regards a bicycle transmission system and, in particular, a hydrostatic bicycle transmission system. In this context, it is specified that the expression bicycle is used to indicate any vehicle with one (unicycle), two, three (tricycle) or more wheels (quadricycles, rickshaws, etc.) driven by human muscle force.

BACKGROUND

As is known, most bicycles currently on the market use a mechanical system for the transmission of kinetic energy from the pedal cranks to the drive wheel. This mechanical system typically consists of a chain which is driven by one or more chainrings and which transmits the kinetic energy to one or more sprockets of various sizes. The speed of the bicycle increases or decreases depending on the choice of ratios, each corresponding to a respective chainring and/or a respective sprocket and to a fixed pedalling frequency.

Although not very common, another mechanical bicycle transmission system uses a cardan shaft and bevel gears. With this transmission system, a special internal gear hub is used for speed change. Lastly, there are mechanical transmission systems that can be defined as hybrid, which use internal gear hubs and a fixed ratio chain. In these hybrid systems, the chainring and the sprockets are identical and the derailleur can be arranged at the pedal cranks, or near the rear drive wheel.

However, the present mechanical transmission systems for bicycles reveal some drawbacks. In particular, in the conventional chain system the chain can break, while the teeth of chainrings and sprockets are subjected to high wear and can also break. The entire transmission system is also exposed to dirt (soil, dust, stones, fresh water, salt water, etc.) and therefore inevitable slideability problems linked to the continuous cleaning and lubrication of the components can occur.

The chain may accidentally disengage from the chainring and/or from sprockets, resulting in "idle" pedalling. Stressed by the engagement with the teeth of chainrings and sprockets, the chain is in any case subjected to stresses when shifting gears and it generates noises and possible breakages due to frictions. Lastly, in the conventional chain system the ratios are fixed, since they are determined by the diameter and the number of teeth of chainrings and sprockets, with the impossibility of having multiple choices of ratios if not by manually replacing the chainrings and/or sprockets.

Even the transmission systems with a cardan shaft or of a hybrid type reveal some drawbacks, among which the fact of having fixed ratios and with little choice in terms of gear shifting. In addition, in these systems there is also a greater difficulty in varying the transmission ratios, even by intervening manually, since the replacement of the components is even more difficult than in the conventional chain system.

Hydrostatic transmission systems have therefore been provided for bicycles, such as those described for example in documents U.S. Pat. No. 5,938,224 A, WO 2016/036130 A1, WO 95/25036 A1, WO 92/12042 A1 and CN 2156126 Y. Each of these documents actually describes a respective bicycle whose transmission system is of the hydrostatic type and comprises at least one hydraulic pump, driven by the pedal crank/pedal assembly, and at least one hydraulic actuator, configured to transform the hydraulic energy supplied by the hydraulic pump into mechanical energy, so that such mechanical energy is transferred to the drive wheel of the bicycle. However, none of these bicycles is provided with electrical and/or electronic devices capable of guaranteeing the so-called pedal-assisted mode.

SUMMARY

Thus, the object of the present invention is to provide a bicycle transmission system, in particular a hydrostatic bicycle transmission system, that is capable of overcoming the aforementioned drawbacks of the prior art in an extremely simple, cost-effective and particularly functional manner.

In detail, an object of the present invention is to provide a bicycle transmission system which, in a so-called pedal-assisted bicycle or e-bike (thus provided with an electric motor), allows to make the assistance provided by the transmission system as fluid and natural as possible for the cyclist.

Another object of the present invention is to provide a bicycle transmission system which does not generate any drawback deriving from the breaking of the components, due to use in dirty environments and due to the presence of water.

Another object of the present invention is to provide a bicycle transmission system which has no maintenance problems.

Another object of the present invention is to provide a bicycle transmission system with very little wear on the components, even when subjected to intense use.

Another object of the present invention is to provide a bicycle transmission system which has infinite ratios and does not entail any problem in the selection of the suitable ratio.

Another object of the present invention is to provide a bicycle transmission system which allows a fluid pedalling and without clearances.

Another object of the present invention is to provide a bicycle transmission system which allows to vary the ratios under all conditions, even when 100% under stress, without problems related breakages or uncertainties in the thrust on the pedal cranks.

A further object of the present invention is to provide a bicycle transmission system which allows the bicycle to be used even totally submerged in salt water (sea areas) without any problem.

These and other objects according to the present invention are achieved by providing a bicycle transmission system as outlined in claim 1.

Further features of the invention are highlighted by the dependent claims, which are an integral part of the present description.

According to the present invention, the bicycle transmission system is of the hydrostatic type and it comprises a hydraulic pump and a hydraulic actuator. The hydraulic fluid (typically consisting of oil) pressurised by the hydraulic pump operates the hydraulic actuator so as to transmit kinetic energy to the drive wheel of the bicycle. This hydrostatic transmission system is suitable for all types of bicycles: the hydraulic pump is driven in rotation by the pedal cranks and the hydraulic fluid under pressure drives the drive shaft of the hydraulic actuator, connected to the drive wheel or to the drive wheels of the bicycle, in rotation.

BRIEF DESCRIPTION OF THE DRAWINGS

The features and advantages of a bicycle transmission system according to the present invention will become more apparent from the following description, provided by way of non-limiting example, with reference to the attached schematic drawings, wherein.

DETAILED DESCRIPTION

With reference to the figures, shown is a preferred embodiment of the hydrostatic transmission system for bicycles according to the present invention. The bicycle is indicated in its entirety with reference number 10, while the transmission system is indicated in its entirety with reference number 20.

Figure 1:
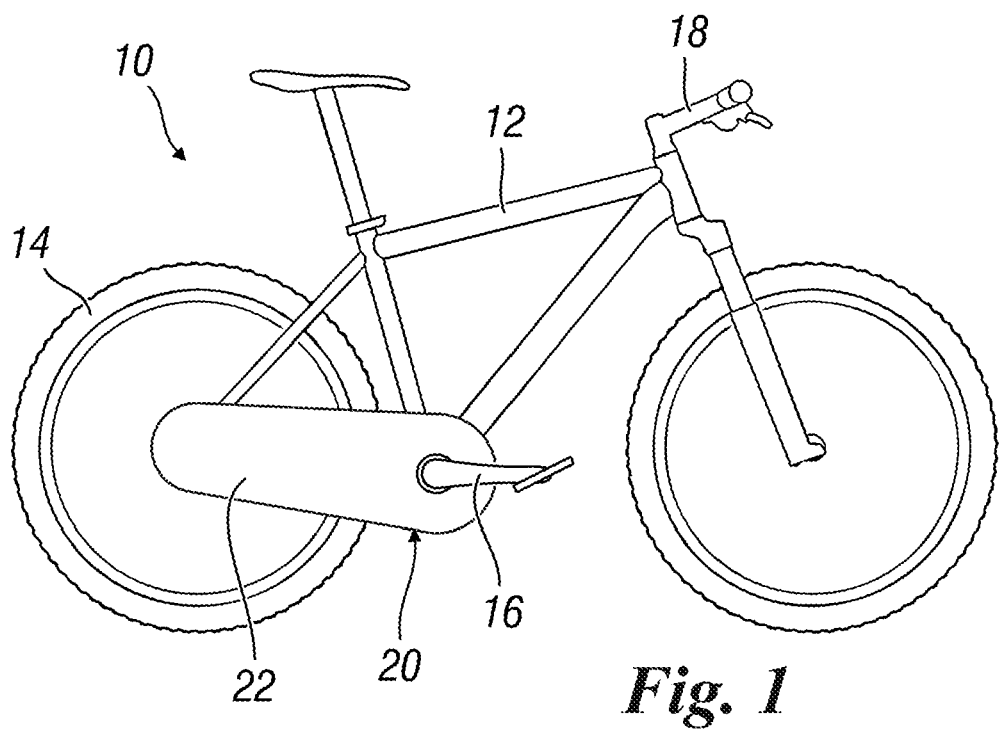
FIG. 1 is a side elevational schematic view of a generic bicycle provided with the hydrostatic transmission system according to the present invention.

The bicycle 10 is of the type comprising at least one frame 12, at least one drive wheel 14 and at least one pedal crank/pedal assembly 16 configured to transmit mechanical energy to the drive wheel 14 through the transmission system 20. The bicycle 10 can therefore be provided, in a per se known manner, with a steering 18, with at least one front steering wheel, with a braking system, with a saddle and with other possible accessories. Even though FIG. 1 shows a bicycle 10 with two wheels of the conventional type, it cannot be ruled out that the transmission system 20 can be applied to other types of bicycles or similar vehicles, such as for example unicycles, tricycles or rickshaws, provided that they are driven by human muscle force.

Figure 2:
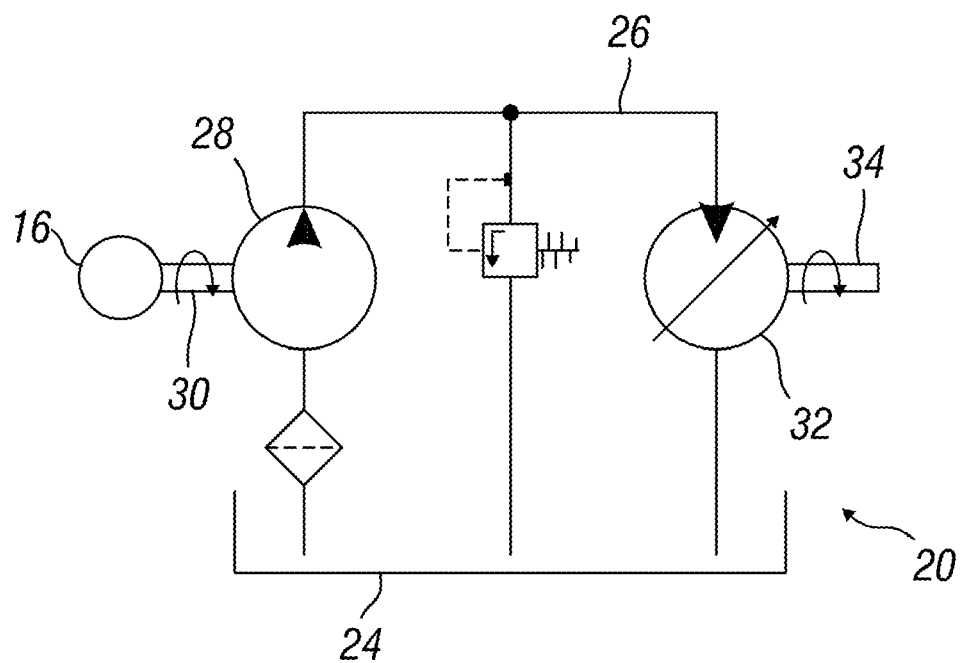
FIG. 2 is a schematic view of the hydraulic circuit and of the main components of the hydrostatic transmission system for bicycles according to the present invention.

As shown in FIG. 2, the transmission system 20 comprises a watertight casing 22 which houses:
- at least one tank 24 containing a hydraulic fluid;
- a hydraulic circuit 26 in which the hydraulic fluid flows;
- at least one hydraulic pump 28, driven by the pedal crank/pedal assembly 16 by means of at least one first drive shaft 30 and configured to pump the hydraulic fluid through the hydraulic circuit 26;
- at least one hydraulic actuator 32, arranged along the hydraulic circuit 26 and configured to transform the hydraulic energy supplied by the hydraulic pump 28 to the hydraulic fluid into mechanical energy. The hydraulic actuator 32 performs a rotary motion with a predefined number of revolutions (rad/s) and a predefined torque/twisting moment (Nm). In other words, the hydraulic actuator 32 receives hydraulic energy (pressure by flow rate or p×Q) in input and it delivers mechanical energy (torque by speed) in output;
- at least one second transmission shaft 34, operatively connected to the hydraulic actuator 32 and configured to transfer the mechanical energy generated by said hydraulic actuator 32 to the drive wheel 14.

Preferably, in order to improve the technical features of the bicycle transmission system 20, the hydraulic pump 28 is a variable displacement pump, while the hydraulic actuator 32 is a fixed displacement hydraulic motor. This combination defines a constant torque transmission system 20, due to the fact that for each speed value the torque depends only on the operating pressure and on the displacement capacity of the fixed displacement hydraulic motor 32. This configuration of the transmission system 20 allows to adjust the power directly by acting on the displacement capacity of the hydraulic pump 28, which linearly varies the rotational speed of the fixed displacement hydraulic motor 32, as shown in the diagram of FIG. 2. If the variable displacement hydraulic pump 28 rotates at a constant speed, the rotational speed of the fixed-displacement hydraulic motor 32 is proportional to the displacement capacity of the hydraulic pump 28, which is variable between 0 and its maximum displacement value.

Figure 3:
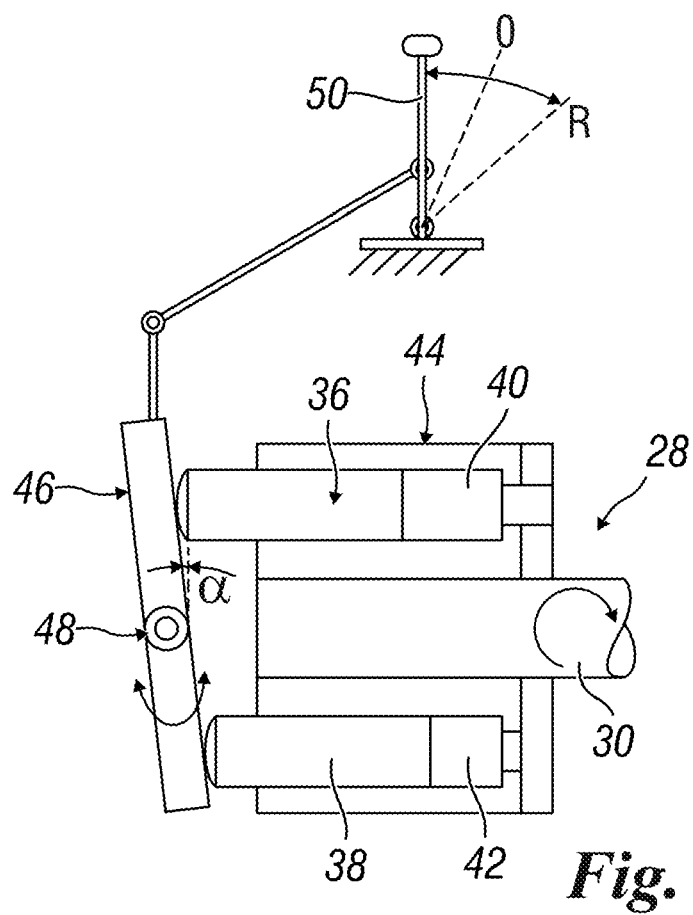
FIG. 3 is a schematic view of a first preferred embodiment of a hydraulic pump of the hydrostatic transmission system for bicycles according to the present invention.

A preferred but not exclusive embodiment of the variable displacement hydraulic pump 28 of the bicycle transmission system 20 is illustrated in FIG. 3. As a matter of fact, FIG. 3 shows a variable displacement hydraulic pump 28 provided with at least one axial piston 36, 38 with reference to the rotation axis of the first drive shaft 30. Each axial piston 36, 38 is movable with reciprocating motion in a respective chamber 40, 42 obtained in a cylinder block 44 rotatably integrally joined with the first drive shaft 30. Each chamber 40, 42 is thus placed in fluid connection with the hydraulic circuit 26 to receive the hydraulic fluid.

In the embodiment of FIG. 3, the pedal crank/pedal assembly 16 drives the first drive shaft 30 in rotation and thus also the cylinder block 44 integrally joined with such drive shaft 30. Besides being driven by a reciprocating motion in the respective chambers 40, 42, the axial pistons 36, 38 also rotate because they are s driven by the first drive shaft 30.

The variable displacement hydraulic pump 28 of FIG. 3 is provided with a mechanism for varying the displacement capacity consisting of at least one oscillating plate 46 arranged at contact with each axial piston 36, 38 to adjust the stroke thereof in the respective chamber 40, 42. The oscillating plate 46 is hinged on a fixed portion of the casing 22 by means of a respective pin 48 and the inclination thereof with respect to a vertical axis is controlled by means of a manually operated adjustment lever 50, arranged on the frame 12 or on the steering 18 of the bicycle 10.

Operatively, when controlled by the respective adjustment lever 50, the oscillating plate 46 can rotate around the respective pin 48. The inclination of the oscillating plate 46 with respect to a vertical axis can preferably vary according to an angle comprised between 0° and about 18.5°, thus varying the displacement of the chambers 40, 42 and thus the flow rate and pressure of the hydraulic fluid in the hydraulic circuit 26.

Figure 4:
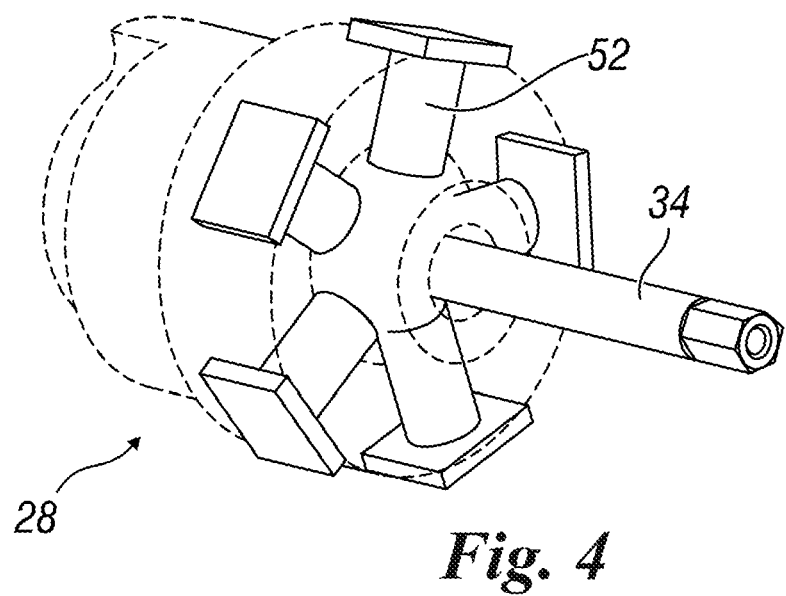
FIG. 4 is a perspective view of a preferred embodiment of a hydraulic actuator of the hydrostatic transmission system for bicycles according to the present invention.

FIG. 4 shows a preferred but not exclusive embodiment of the hydraulic actuator 32. This hydraulic actuator 32 is a fixed displacement hydraulic motor provided with a plurality of radial pistons 52 connected to a second eccentric drive shaft 34.

The second eccentric drive shaft 34 is driven in rotation by the thrust of the pistons 52, which—in the embodiment of FIG. 4—are five and are positioned radially with respect to such second eccentric drive shaft 34. The thrust sequence is determined by a rotating distributor integrally joined with the second eccentric drive shaft 34. The second eccentric drive shaft 34 is thus integrally joined with the drive wheel 14 of the bicycle 10.

However, it cannot be ruled out that the hydraulic actuator 32 can be made in a different manner with respect to what is illustrated in the figures. As a matter of fact, the hydraulic actuator 32 can consist of any hydraulic or oil hydraulic motor, whether it has a fixed or variable displacement. For example, besides the fixed displacement hydraulic motor of FIG. 4, the hydraulic actuator 32 may consist of an axial piston motor, a gear motor, a vane motor or a cam motor. The hydraulic pump 28 can also be a fixed or variable displacement hydraulic pump and, besides the hydraulic pump 28 with axial pistons of FIG. 3, it can for example consist of a pump with radial pistons, a gear pump, a vane pump or a cam pump.

Figure 5:
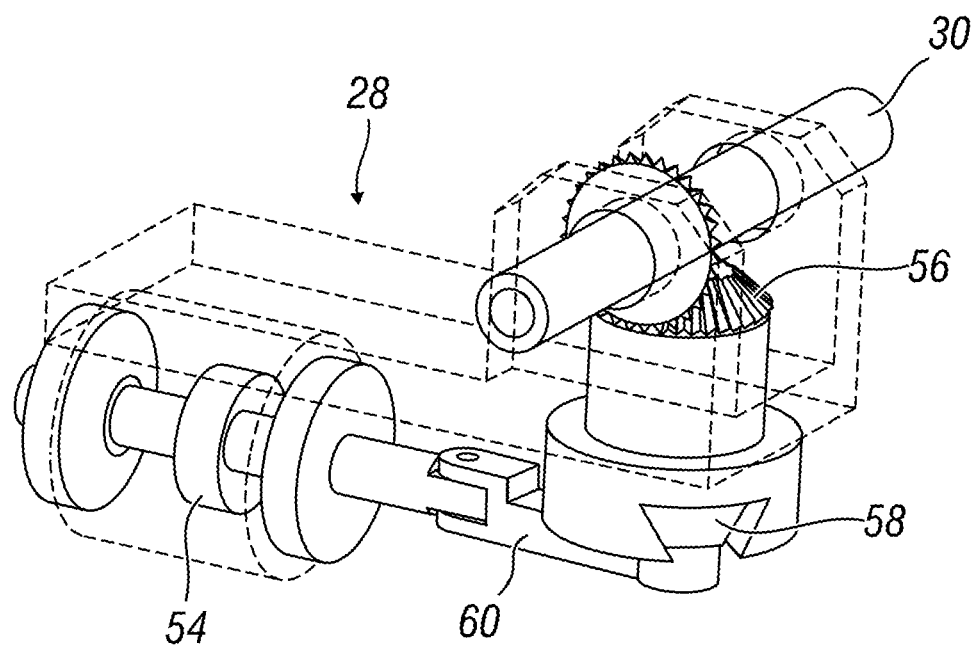
FIG. 5 is a perspective view of a second preferred embodiment of a hydraulic pump of the hydrostatic transmission system for bicycles according to the present invention.

Another preferred but not exclusive embodiment of the variable displacement hydraulic pump 28 of the bicycle transmission system 20 is illustrated in FIG. 5. As a matter of fact, FIG. 5 shows a variable displacement hydraulic pump 28 provided with at least one double-acting piston 54. By means of the first drive shaft 30 and a bevel gear 56, the pedal crank/pedal assembly 16 transmits the movement to a cam mechanism 58 which, by means of a connecting rod 60, linearly translates the double-acting piston 54 back and forth.

By varying the position of the cam mechanism 58, and hence the fulcrum of the connecting rod 60, the stroke of the double-acting piston 54 is varied and consequently the displacement of the pump 28 and thus the flow rate and the pressure of the hydraulic fluid in the hydraulic circuit 26. Just like in the case of the variable displacement hydraulic pump 28 and axial pistons of FIG. 3, the displacement variation is linear in this pump 28 with double-acting piston 54 too.

Figure 6:
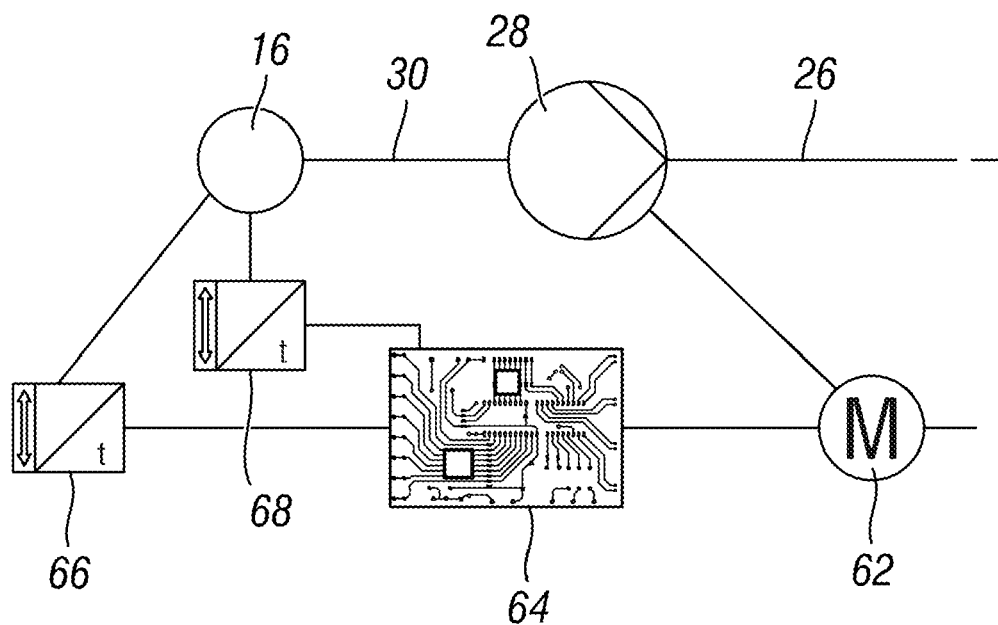
FIG. 6 is a schematic view of electronic components of the hydrostatic transmission system for bicycles according to the present invention.

With reference to FIG. 6, some components of the "assisted" transmission system 20 according to the present invention are shown. In this transmission system 20, the hydraulic pump 28 is operatively connected to at least one electric motor 62. The rotational speed of the electric motor 62, and hence also the operating parameters of the hydraulic pump 28, are controlled by a circuit board 64. The (variable) pressure generated by the hydraulic pump 28 driven by the electric motor 62 thus assists pedalling, transforming the hydrostatic transmission system 20 into an "assisted" hydrostatic transmission system 20.

Provided for is at least one first pedal frequency sensor 66, operatively connected to the circuit board 64, to the pedal crank/pedal assembly 16 and to the respective first drive shaft 30. Depending on the pedalling frequency, set by the cyclist and controlled by the first sensor 66, the circuit board 64 controls the electric motor 62, modulating the rotational speed thereof, so as to make the hydraulic pump 28 rotate more or less rapidly to force the circulation of the hydraulic fluid in the hydraulic circuit 26, assisting the pedalling.

Also provided for is at least one second power sensor 68 (such as a torque meter), also operatively connected to the circuit board 64, to the pedal crank/pedal assembly 16 and to the respective first drive shaft 30. The second sensor 68 measures the power applied by the cyclist to the pedal crank/pedal assembly 16 so as to accordingly adjust, by means of the circuit board 64, the power delivered by the electric motor 62 to actuate the hydraulic pump 28. Basically, besides the pedalling frequency, the circuit board 64 also measures the power delivered by the cyclist and adjusts the "auxiliary" power delivered by the electric motor 62, so as to make the assistance provided by the transmission system 20 as fluid and as natural as possible.

Figure 7:
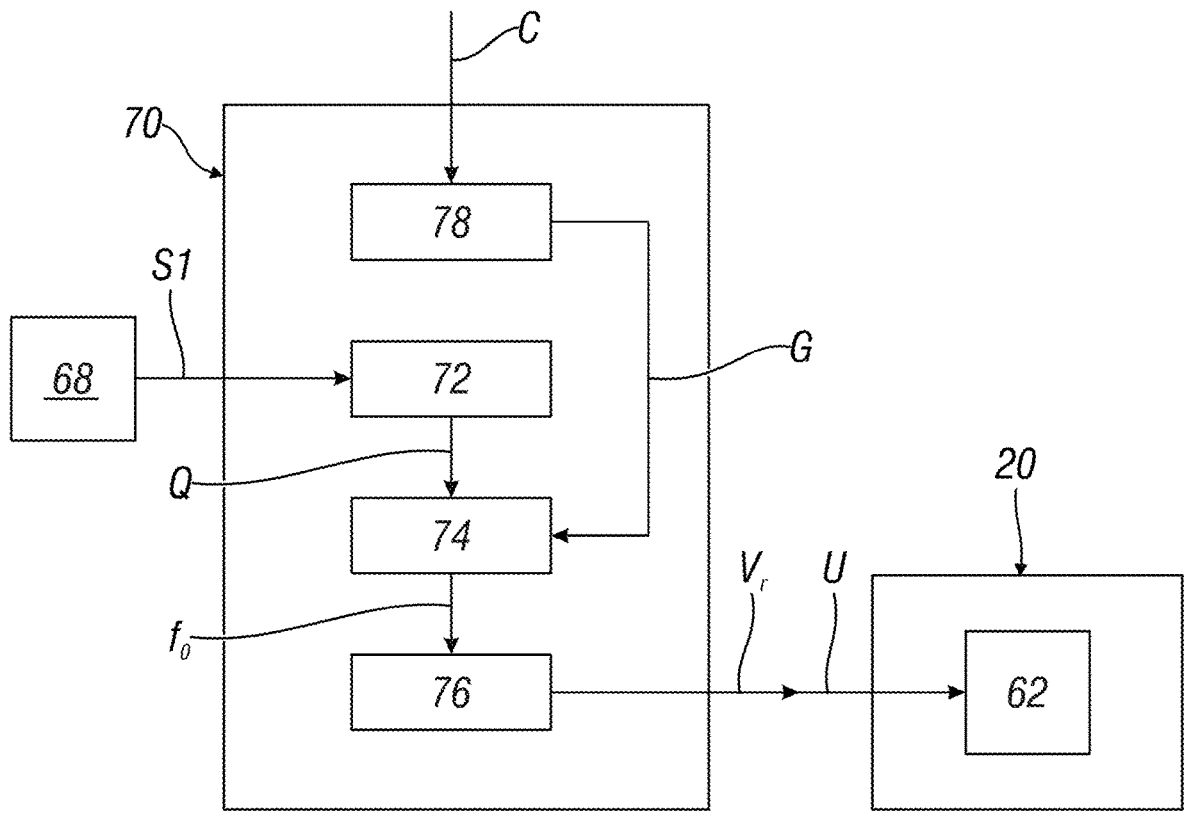
FIG. 7 is another schematic view of the electronic components of the hydrostatic transmission system for bicycles according to the present invention.

In detail, with reference to FIG. 7, the circuit board 64 of the "assisted" hydrostatic transmission system 20 according to the present invention is provided with a processing unit 70. The processing unit 70 comprises at least one reading module 72 configured to collect an incremental value Q from the signal S1 obtained from the power sensor 68, which for example consists of a torque meter. Basically, the reading module 72 acquires the value Q in digital or, alternatively, analogue form.

The processing unit 70 further comprises at least one control module 74 configured to obtain a target value $f_0$ from the frequency value f obtained from the pedal frequency sensor 66. This target value $f_0$ is a function of the aforementioned incremental value Q. The processing unit 70 further comprises at least one operating module 76 configured to vary the frequency value f as a function of the target value $f_0$. The operating module 76 of the processing unit 70 is associated with the electric motor 62 and it can increase or decrease the revolutions thereof. In other words, the operating module 76 of the processing unit 70 is configured to select a rotational speed $V_r$ of the electric motor 62 as a function of the target value $f_0$ and of the frequency value f. The operating module 76 of the processing unit 70 is thus configured to send a control signal U to the electric motor 62 and such control signal U represents a determined rotational speed $V_0$ of the electric motor 62.

The processing unit 70 is configured to calculate the gain G as a function of a pre-established parameter C and it can be entered by the cyclist. The processing unit 70 also comprises at least one interface module 78 configured for customisation of the parameter C by the cyclist, for example using a keyboard, knob, etc.

With respect to the transmission systems of conventional pedal-assisted bicycles (e-bikes), it should be observed that in the "assisted" hydrostatic s transmission system 20 according to the present invention there are no reduction gears, belts, chains and other components that generate yield losses due to friction. This "assisted" hydrostatic transmission system 20 is therefore advantageous in terms of efficiency and lower energy consumption. However, being able to operate at low pressures (below 100 bar), this "assisted" hydrostatic transmission system 20 does not create problems related to the temperature of the hydraulic fluid which could reduce the efficiency. Besides operating at low pressures, the "assisted" hydrostatic transmission system 20 operates even at very low hydraulic fluid speeds: resulting in a better efficiency.

It has thus been observed that the bicycle transmission system according to the present invention attains the objectives described above, in particular obtaining the following advantages:
  no drawback deriving from the breaking of the components, from the use in dirty environments and from the presence of water, thanks to the watertight casing 22;
  no maintenance problems, thanks to the hydraulic circuit 26 closed in the watertight casing 22. By using special hydraulic fluids, suitable for the application, no maintenance is required and the transmission system 20 is guaranteed for very many kilometres of use without any maintenance intervention;
  very little wear of the components, even under intense use, since the hydraulic fluid, which preferably consists of a specific mineral oil, also acts as a lubricant;
  infinite ratios and no problem in the choice of the suitable ratio, since the hydraulic pump 28 and the hydraulic actuator 32, preferably consisting of a variable displacement/geometry pump and a fixed displacement motor, respectively, can operate from 0 up to the maximum of the displacement capacity with an infinite range of ratios and therefore of speed;

smooth pedalling and without clearances;

possibility to vary the ratios under all conditions, even at 100% under stress, without problems of breakages or uncertainties in the thrust on the pedal cranks;

possibility of creating the transmission system 20 with different hydraulic pumps 28 and hydraulic actuators 32 made of various materials;

possibility to use the bicycle 10 even totally submerged in salt water (sea areas) without any problem.

The hydraulic actuator 32 can be sized so as to cover all the torque and speed ranges that are currently used on commercially available bicycles. The hydraulic actuator 32 can be made of aluminium alloys or light fibres, capable of withstanding high pressures and high temperatures.

The hydraulic pump 28 can be sized to meet all the operating parameters of the hydraulic actuator 32. The adjustment of the displacement capacity of the hydraulic pump 28 can be managed both manually by means of a remote control, similar to a conventional derailleur, therefore with or without the aid of electronic devices, and automatically with specific electronics.

The transmission system 20 may also have a fixed range of variation, similar to the standard sprockets, or a continuous variation. Basically, starting from standstill to maximum speed, there will be no "gaps" or "delays" due to the gear shifts, since this is a uniform variation according to biometric or subjective parameters.

The bicycle transmission system of the present invention thus conceived is in any case susceptible to numerous modifications and variations, all falling within the same inventive concept; furthermore, all the details can be replaced with technically equivalent elements. Basically, the materials used as well as the shapes and dimensions may vary according to the technical needs.

The scope of protection of the invention is therefore defined by the attached claims.

The invention claimed is:

1. A bicycle (10) comprising at least one frame (12), at least one drive wheel (14) and at least one pedal crank/pedal assembly (16) configured to transmit mechanical energy to said at least one drive wheel (14) through a transmission system (20), said transmission system (20) comprising a watertight casing (22) within which there are housed:
   at least one tank (24) containing a hydraulic fluid;
   a hydraulic circuit (26) within which said hydraulic fluid flows;
   at least one hydraulic pump (28), driven by the pedal crank/pedal assembly (16) through at least one first drive shaft (30) and configured to pump said hydraulic fluid through said hydraulic circuit (26);
   at least one hydraulic actuator (32), arranged along said hydraulic circuit (26) and configured to transform hydraulic energy supplied by said at least one hydraulic pump (28) to the hydraulic fluid into mechanical energy, wherein said at least one hydraulic actuator (32) performs a rotary motion with a predefined number of revolutions and a predefined torque/twisting moment;
   at least one second drive shaft (34), operatively connected to said at least one hydraulic actuator (32) and configured to transfer the mechanical energy generated by said at least one hydraulic actuator (32) to said at least one drive wheel (14), wherein said at least one hydraulic pump (28) is operatively connected to at least one electric motor (62), wherein a rotational speed of said at least one electric motor (62), and hence also operating parameters of said at least one hydraulic pump (28), are controlled by a circuit board (64), the bicycle (10) further comprising:
   at least one first pedal frequency sensor (66), operatively connected to said circuit board (64), to said pedal crank/pedal assembly (16) and to the respective first drive shaft (30) in such a way that, depending on the pedalling frequency set by the cyclist and controlled by said at least one first sensor (66), said circuit board (64) controls said at least one electric motor (62) modulating the rotational speed, so as to make said at least one hydraulic pump (28) rotate more or less rapidly to force the circulation of the hydraulic fluid in said hydraulic circuit (26), facilitating pedalling; and
   at least one second power sensor (68), also operatively connected to said circuit board (64), to said pedal crank/pedal assembly (16) and to the respective first drive shaft (30), said at least one second sensor (68) measuring the power applied by the cyclist to said pedal crank/pedal assembly (16) to accordingly adjust, through said circuit board (64), the power delivered by said at least one electric motor (62) to drive said at least one hydraulic pump (28);

wherein said circuit board (64) is provided with a processing unit (70) comprising:
   at least one reading module (72), configured to collect an incremental value (Q) from the signal (S1) obtained from said at least one second power sensor (68);
   at least one control module (74), configured to obtain a target value (f0) from a frequency value (f) obtained from said at least one first pedal frequency sensor (66), wherein said target value (f0) is a function of said incremental value (Q); and
   at least one operating module (76), associated with said at least one electric motor (62) and configured both to select the rotational speed (Vr) of said at least one electric motor (62) as a function of said target value (f0) and of said frequency value (f) and for sending a control signal (U) representing a determined rotational speed (V0) of said at least one electric motor (62) to said at least one electric motor (62).

2. The bicycle (10) according to claim 1, characterized in that said at least one hydraulic pump (28) is a variable displacement pump, whereas said at least one hydraulic actuator (32) is a fixed displacement hydraulic motor, so that said transmission system (20) is a constant torque transmission system in which, for each speed value, the torque depends only on the operating pressure and the displacement capacity of said fixed displacement hydraulic motor (32).

3. The bicycle (10) according to claim 2, characterized in that said variable displacement hydraulic pump (28) is provided with at least one axial piston (36, 38) with reference to the rotation axis of said first drive shaft (30), each axial piston (36, 38) being movable with reciprocating motion within a respective chamber (40, 42) obtained in a cylinder block (44) rotatably integrally joined with said first drive shaft (30), each chamber (40, 42) being placed in fluid connection with said hydraulic circuit (26) to receive the hydraulic fluid.

4. The bicycle (10) according to claim 3, characterized in that said variable displacement hydraulic pump (28) is provided with a mechanism for varying the displacement capacity, said mechanism consisting of at least one oscillating plate (46) placed at contact with each axial piston (36, 38) to adjust a stroke of each axial piston within the respective chamber (40, 42), said oscillating plate (46) being hinged on a fixed portion of said casing (22) by means of a respective pin (48), the inclination of said oscillating plate (46) with respect to a vertical axis being controlled by means of a manually operated adjustment lever (50).

5. The bicycle (10) according to claim 2, characterized in that said variable displacement hydraulic pump (28) is provided with at least one double-acting piston (54), wherein said pedal-crank/pedal assembly (16), through said first drive shaft (30) and a bevel gear (56), transmits the movement to a cam mechanism (58) which, by means of a connecting rod (60), linearly translates the double-acting piston (54) forward and backward, and wherein the variation of the position of said cam mechanism (58), and hence of the fulcrum of said connecting rod (60), causes the variation of the stroke of said double-acting piston (54) and consequently the variation of the displacement capacity of the pump (28) and the variation of a flow rate and pressure of the hydraulic fluid within said hydraulic circuit (26).

6. The bicycle (10) according to claim 2, characterized in that said fixed displacement hydraulic motor (32) is provided with a plurality of radial pistons (52) connected to the second eccentric drive shaft (34), driven in rotation by the thrust of said pistons (52) which are positioned radially with respect to said second eccentric drive shaft (34), wherein the thrust sequence is determined by a rotary distributor integrally joined with said second eccentric drive shaft (34) and wherein said second eccentric drive shaft (34) is integrally joined with said at least one drive wheel (14).

7. The bicycle (10) according to claim 1, characterized in that said at least one hydraulic pump (28) is a fixed or variable displacement pump selected from among the group consisting of:
a pump with radial pistons,
a gear pump,
a vane pump,
a cam pump.

8. The bicycle (10) according to claim 1, characterized in that said at least one hydraulic actuator (32) is a fixed or variable displacement motor selected from among the group consisting of:
a motor with axial pistons,
a gear motor,
a vane motor,
a cam motor.

9. The bicycle (10) according to claim 1, characterized in that said at least one second power sensor (68) consists of a torque meter.

* * * * *